United States Patent [19]
Fant

[11] Patent Number: 5,721,962
[45] Date of Patent: Feb. 24, 1998

[54] METHOD OF MAKING SINGLE-USE CAMERA WITH ELECTRONIC FLASH UNIT FROM PREVIOUSLY USED CAMERA PARTS

[75] Inventor: Alfred Bruce Fant, Rochester, N.Y.

[73] Assignee: Eastman Kodak Company, Rochester, N.Y.

[21] Appl. No.: 768,685

[22] Filed: Dec. 18, 1996

Related U.S. Application Data

[63] Continuation of Ser. No. 368,468, Jan. 4, 1995, abandoned.

[51] Int. Cl.$^6$ ................................... G03B 15/03
[52] U.S. Cl. ................... 396/6; 396/205; 396/543
[58] Field of Search ........................... 396/6, 205, 207, 396/208, 543

[56] References Cited

U.S. PATENT DOCUMENTS

| | | | |
|---|---|---|---|
| 2,493,928 | 1/1950 | Rath | 354/21 |
| 3,667,363 | 6/1972 | Tanaka | 354/21 |
| 4,024,557 | 5/1977 | Aoyama et al. | 354/275 |
| 4,077,041 | 2/1978 | Imura | 354/21 |
| 4,195,921 | 4/1980 | Lermann et al. | 354/21 |
| 4,270,851 | 6/1981 | Takazawa et al. | 354/21 |
| 5,136,317 | 8/1992 | Goto et al. | 354/21 |
| 5,410,378 | 4/1995 | Tasaka et al. | 354/149.11 |
| 5,436,685 | 7/1995 | Yamashina | 354/202 |

*Primary Examiner*—Eddie C. Lee
*Attorney, Agent, or Firm*—Roger A. Fields

[57] ABSTRACT

A method of making a single-use camera with an electronic flash unit from previously used camera parts, comprising the steps of loading an unexposed-film cassette into a cassette-receiving chamber of a used main body part, locating an electrically conductive area of the film cassette against a pair of spaced electrical contacts of a flash circuit of the flash unit to cause the conductive area to bridge the spaced contacts to complete the flash circuit, and positioning a used rear cover part on the main body part to make the main body part light-tight for unexposed film withdrawn from the cassette. The method discourages unauthorized recycling of the single-use camera.

1 Claim, 3 Drawing Sheets

METHOD OF MAKING SINGLE-USE CAMERA WITH ELECTRONIC FLASH UNIT FROM PREVIOUSLY USED CAMERA PARTS

This is a Continuation of application Ser. No. 08/368,468, filed Jan. 4, 1995, now abandoned.

FIELD OF THE INVENTION

The invention relates generally to the field of photography, and in particular to single-use cameras. More specifically, the invention relates to a single-use camera which can be recycled at the manufacturer to permit it to be reused like an originally manufactured one.

BACKGROUND OF THE INVENTION

Film and cameras that are all in one, commonly referred to as single-use cameras, have recently become well known. Typically, the single-use camera is a simple point-and-shoot type comprising a plastic, inner, main body portion which supports a fixed-focus taking lens, a film metering mechanism, a manual film advance thumbwheel, a single-blade shutter, a manual shutter release button, a frame counter for indicating the number of exposures remaining for picture-taking, a direct see-through viewfinder, and possibly an electronic flash unit. Plastic front and rear casing or cover portions house the main body portion between them to form a light-tight camera unit. A decorative cardboard outer box contains the camera unit and has respective openings for the taking lens, the shutter release button, the film advance thumbwheel, the viewfinder, the frame counter, and a flash emission window.

At the manufacturer, the main body portion is loaded with a 12, 24, or 36 exposure 35 mm film cassette, and the front and rear casing portions are connected to each other and/or to the main body portion to assemble a light-tight camera unit. Then, an exposed end of a spool in the main body portion is rotated to factory prewind substantially the entire length of the unexposed filmstrip from the cassette onto the spool. Lastly, the outer box is placed on the camera unit.

After the photographer takes a picture with the single-use camera, he or she manually rotates the thumbwheel to rewind the exposed frame into the cassette. The rewinding movement of the filmstrip the equivalent of slightly more than one frame width rotates a metering sprocket in engagement with the filmstrip to decrement the frame counter to its next lower-numbered setting. When the maximum number of exposures available on the filmstrip are exposed and the filmstrip is completely rewound into the cassette, the single-use camera is given to a photofinisher who tears the outer box off the camera unit, separates the rear cover portion from the main body portion, and removes the cassette with the filmstrip from the main body portion. Then, he removes the filmstrip from the cassette to develop the negatives and make prints for the customer, and he forwards the used camera parts to the manufacturer for recycling, i.e. remanufacture.

During recycling, the main body portion is re-loaded with a fresh film cassette, and the front and rear casing portions are re-connected to each other and/or to the main body portion. Then, the exposed end of the spool in the main body portion is again rotated to factory prewind substantially the entire length of the unexposed filmstrip from the cassette onto the spool. Lastly, a new outer box is placed on the camera unit.

Quality control of recycled single-use cameras is essential to ensure that the remanufactured cameras are as good as the originally manufactured ones. Thus, unauthorized recycling is to be discouraged.

SUMMARY OF THE INVENTION

According to the invention, a method is provided to discourage unauthorized recycling of a single-use camera with an electronic flash unit.

More specifically, there is provided a method of making a single-use camera with an electronic flash unit from previously used camera parts, comprising:

loading an unexposed-film cassette into a cassette-receiving chamber of a used main body part, and locating an electrically conductive area of the film cassette against a pair of spaced electrical contacts of a flash circuit of the flash unit to cause the conductive area to bridge the spaced contacts to complete the flash circuit; and positioning a used rear cover part on the main body part to make the main body part light-tight for unexposed film withdrawn from the cassette. Thus, the single-use camera can only be recycled using the film cassette with the electrically conductive area, and not using a conventional cassette.

DETAILED DESCRIPTION OF THE INVENTION

The invention is disclosed as being embodied preferably in a single-use 35 mm camera. Because the features of a single-use 35 mm camera are generally known as shown for example in prior art U.S. Pat. No. 5,181,057, issued Jan. 19, 1993, the description which follows is directed in particular only to those elements forming part of or cooperating directly with the disclosed embodiment. It is to be understood, however, that other elements may take various forms known to a person of ordinary skill in the art.

Figure 1:
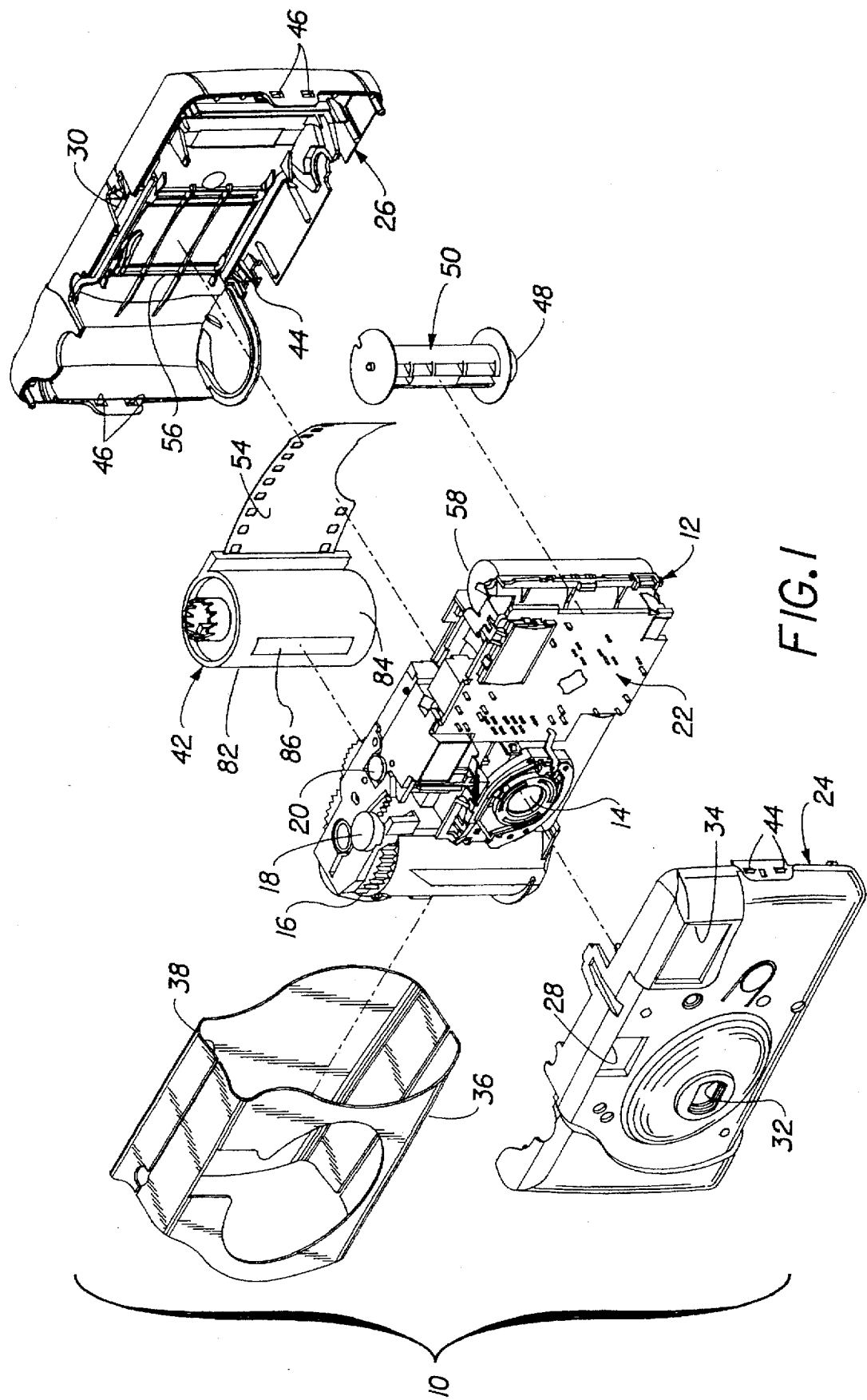
FIG. 1 is an exploded perspective view of a single-use camera with an electronic flash unit.

Referring now to the drawings, FIG. 1 depicts a single-use 35 mm camera 10 which is a simple point- and shoot type comprising a plastic, inner, main body part or frame 12 which supports a number of typical camera components, for example, a fixed-focus taking lens 14, a film metering mechanism, not shown, a manual film advance thumbwheel 16, a single-blade shutter, not shown, a manual shutter release button 18, a frame counter 20 for indicating the number of exposures remaining for picture-taking, and an electronic flash unit 22. Plastic front and rear casing or cover parts 24 and 26 house the main body part 12 between them to form a light-tight camera unit. The front and rear cover parts 24 and 26 have front and rear viewfinder windows 28 and 30, and the front cover part has a lens opening 32 and a flash emission opening 34. Front and rear decorative labels 36 and 38 cover central portions of the front and rear cover parts 24 and 26.

Figure 2:
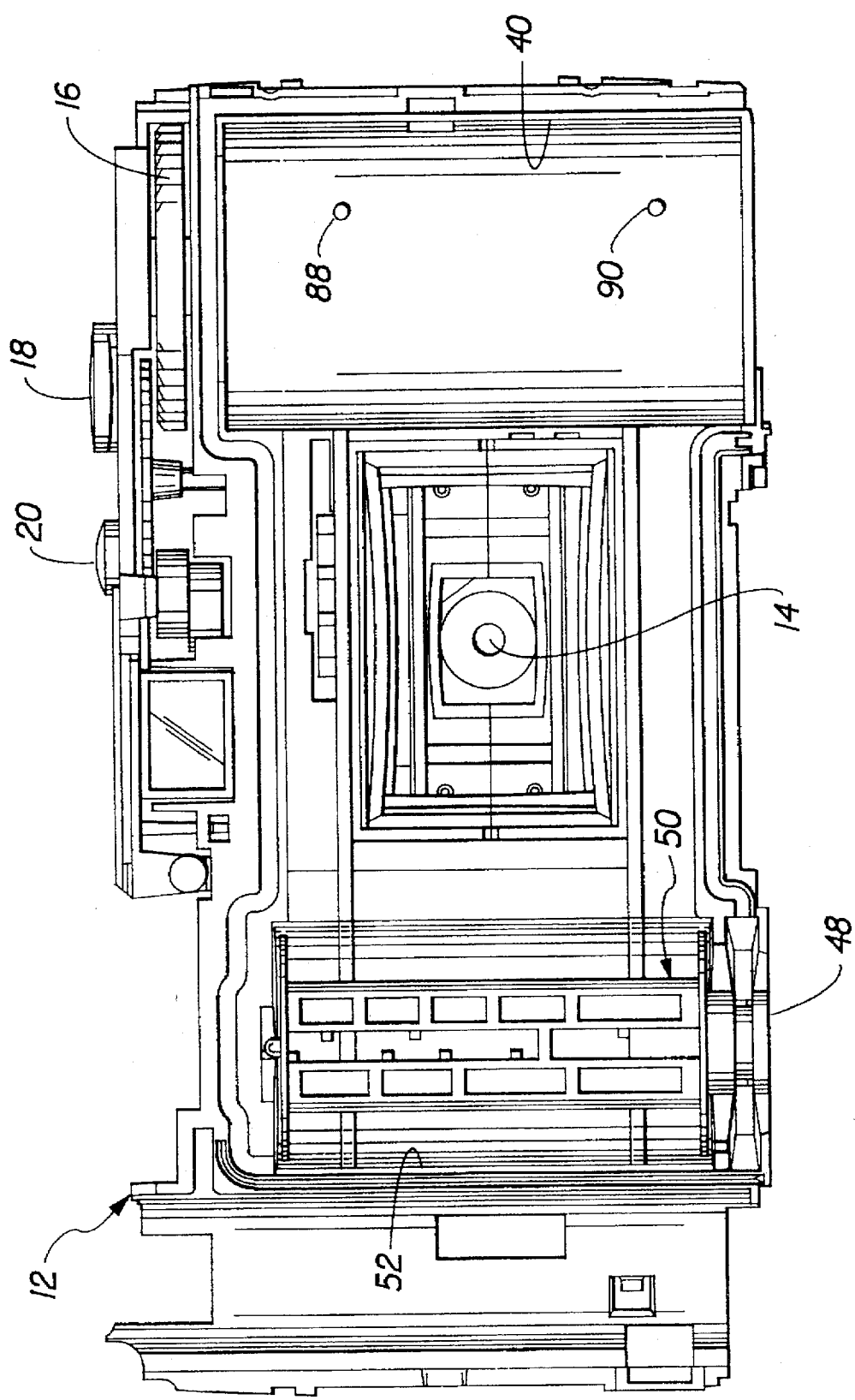
FIG. 2 is a rear elevation view of a main body part of the single-use camera.

At the manufacturer, a cassette-receiving chamber 40 in the main body part 12 is loaded with a 12, 24, or 36 exposure 35 mm film cassette 42. See FIGS. 1 and 2. Then, the front and rear cover parts 24 and 26 are connected to each other with the main body portion 12 between them to assemble a light-tight camera unit. A plurality of hooks 44 and a like number of mating holes 46, only partly shown, on the front and rear cover parts 24 and 26 engage to connect the front and rear cover parts together. Then, in a known manner, an exposed end 48 of a film spool 50 in a film roll chamber 52 in the main body part 12 is rotated to factory prewind substantially the entire length of the unexposed filmstrip 54 from the cassette 42 onto the spool. Lastly, the decorative labels 36 and 38 are placed on the front and rear cover parts 24 and 26.

After the photographer takes a picture with the single-use camera 10, he or she manually rotates the thumbwheel 16 to rewind the exposed frame into the cassette 42. The rewinding movement of the filmstrip 54 the equivalent of slightly more than one frame width rotates a metering sprocket, not shown, in engagement with the filmstrip to decrement the frame counter 20 to its next lower-numbered setting. When the maximum number of exposures available on the filmstrip 54 are exposed and the filmstrip is completely rewound into the cassette 42, the single-use camera 10 is given to a photofinisher. The photofinisher disengages only the two hooks, not shown, and the corresponding holes 46 located at the left-hand sides of the front and rear cover parts 24 and 26, as viewed in FIG. 1, in order to fold the rear cover part back at a groove 56 and uncover the cassette-receiving chamber 40. Then, he removes the cassette 42 with the filmstrip 54 from the chamber 40, he removes the filmstrip from the cassette to develop the negatives and make prints for the customer, and he forwards the main body part 12, the front and rear cover parts 24 and 26, and the film spool 50 to the manufacturer for recycling, i.e. remanufacture.

During recycling, the front cover part 24 is separated from the main body part 12 to permit the taking lens 14 to be removed and replaced with a fresh one. The taking lens 14 is replaced because it may be scratched. Also, the cassette-receiving chamber 40 of the main body part 12 is re-loaded with a fresh film cassette 42, and the front and rear cover parts 24 and 26 are re-connected to each other. Then, the exposed end 48 of the film spool 50 in the film roll chamber 52 of the main body part 12 is again rotated to factory prewind substantially the entire length of the unexposed filmstrip 54 from the cassette 42 onto the spool. Lastly, new front and rear labels 36 and 38 are placed on the front and rear cover parts 24 and 26.

Figure 3:
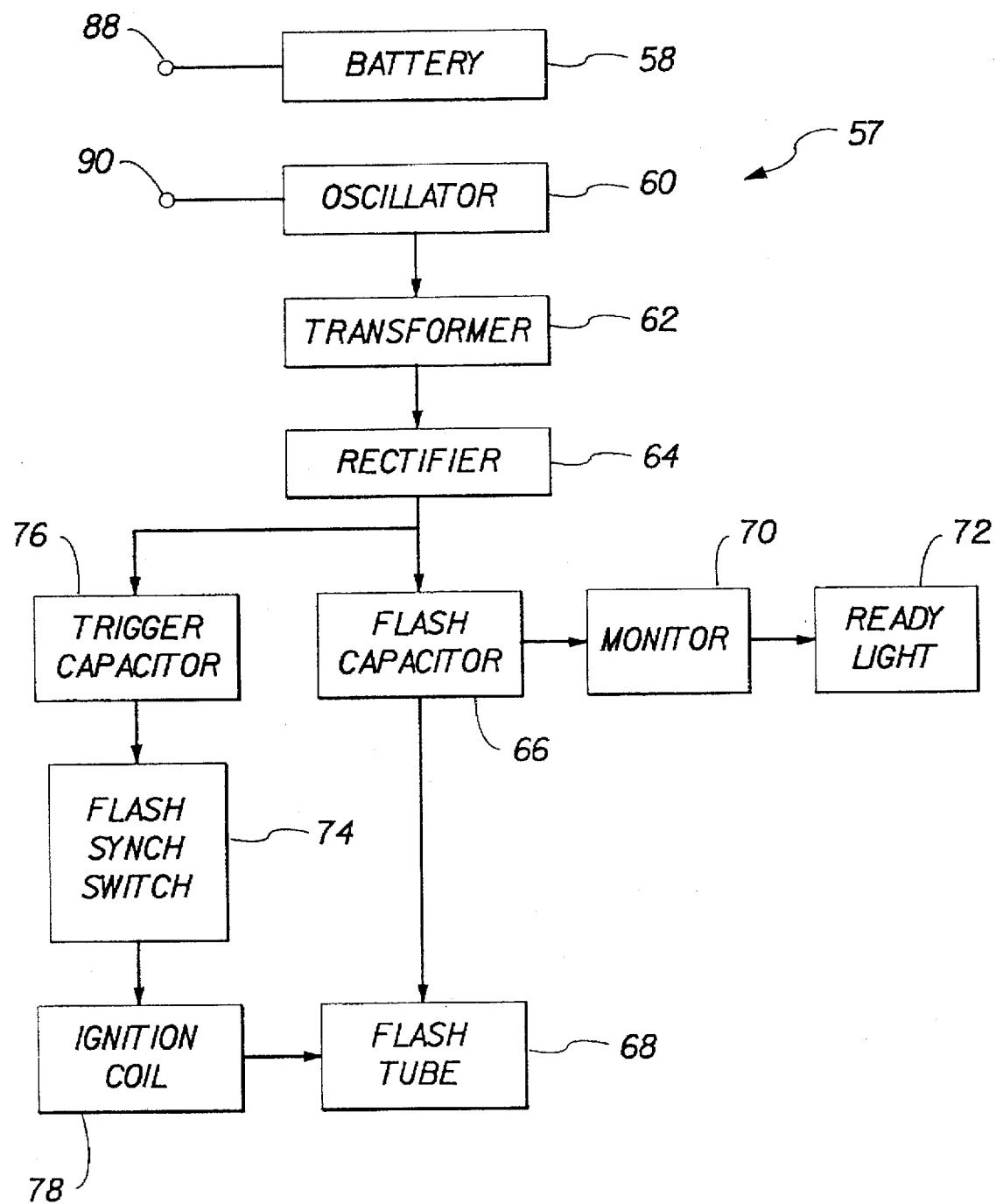
FIG. 3 is a schematic diagram of a flash circuit.

As shown in FIG. 3, the electronic flash unit 22 has a flash circuit 57 including typical flash components, a battery 58, a high-frequency oscillator 60 to convert the dc voltage from the battery to an ac voltage that's stepped up in a transformer 62, a rectifier 64 to rectify back the high voltage to dc, and a flash capacitor 66 for storing the high voltage connected to a flashtube 68 filled with xenon gas. A monitor 70 ignites a ready light 72 when the voltage approaches its peak. The high voltage cannot discharge through the flashtube 68 until its gas becomes ionized.. This happens when a flash sync switch 74 closes, dumping the charge from a trigger capacitor 76 into an ignition coil 78 to produce a brief burst of 5,000 volts applied to the glass wall of the flashtube 68. This ionizes the gas inside, providing a conductive path for the high voltage across the flashtube 68. The sudden discharge creates an intense glowing plasma within the flashtube 68 that lasts about a millisecond.

The film cassette 42 includes a light-tight metal canister 82 which to a certain extent is coated with an insulating paint 84. The insulating paint 84 does not cover an exposed metal area 86 of the canister 82. See FIG. 1. The flash circuit 56 has a pair of spaced contacts 88 and 90 that protrude into the cassette-receiving chamber 40 and must be bridged, i.e. connected, by an electrically conductive element to close or complete the flash circuit. See FIGS. 2 and 3. When the film cassette 42 is loaded in the cassette-receiving chamber 40, the metal area 86 rests against the pair of spaced contacts 88 and 90 to cause the metal area to bridge the spaced contacts to complete the flash circuit 56. Thus, the single-use camera 10 can only be recycled using the film cassette 42 with the exposed metal area 68, and not using a conventional cassette.

The invention has been described with reference to a preferred embodiment. However, it will be appreciated that variations and modifications can be effected by a person of ordinary skill in the art without departing from the scope of the invention.

PARTS LIST 10. single-use camera
12. main body part
14. taking lens
16. film advance thumbwheel
18. shutter release button
20. frame counter
22. electronic flash unit
24. front cover part
26. rear cover part
28. front viewfinder window
30. rear viewfinder window
32. lens opening
34. flash emission window
36. front label
38. rear label
40. cassette-receiving chamber
42. film cassette
44. hooks
46. mating holes
48. exposed spool end
50. film spool
52. film roll chamber
54. filmstrip
56. groove
57. flash circuit
58. battery
60. oscillator
62. transformer
64. rectifier
66. flash capacitor
68. flashtube
70. monitor
72. ready light
74. flash sync switch
76. trigger capacitor
78. ignition coil
82. metal canister
84. insulating paint
86. exposed metal area
88. contact
90. contact

I claim:

1. A method of making a single-use camera with an electronic flash unit from previously used camera parts, comprising:

loading an unexposed-film cassette into a cassette-receiving chamber of a used main body part, and locating an electrically conductive area of the film cassette against a pair of spaced electrical contacts of a flash circuit of the flash unit to cause the conductive area to bridge the spaced contacts to complete the flash circuit to make flash exposures possible; and positioning a used rear cover part on the main body part to make the main body part light-tight for unexposed film withdrawn from the cassette, whereby the single-use camera can only be recycled using the film cassette with the electrically conductive area in order to discourage unauthorized recycling of the single-use camera.

* * * * *